United States Patent [19]

Karayannis et al.

[11] Patent Number: 4,657,882

[45] Date of Patent: Apr. 14, 1987

[54] SUPPORTED OLEFIN POLYMERIZATION CATALYST PRODUCED FROM A MAGNESIUM ALKYL/ORGANOPHOSPHORYL COMPLEX

[75] Inventors: Nicholas M. Karayannis; John S. Skryantz, both of Naperville; Bryce V. Johnson, Elburn, all of Ill.

[73] Assignee: Amoco Corporation, Chicago, Ill.

[21] Appl. No.: 813,603

[22] Filed: Dec. 26, 1985

Related U.S. Application Data

[63] Continuation-in-part of Ser. No. 674,996, Nov. 26, 1984, Pat. No. 4,581,342.

[51] Int. Cl.$^4$ ................................................ C08F 4/64
[52] U.S. Cl. .................................... 502/115; 502/119; 502/121; 526/125; 526/127; 526/137; 526/139
[58] Field of Search ......................... 502/115, 119, 121

[56] References Cited

U.S. PATENT DOCUMENTS

| 4,279,776 | 7/1981  | Shiga et al.   | 502/119 X |
|-----------|---------|----------------|-----------|
| 4,301,029 | 11/1981 | Caunt et al.   | 502/119 X |
| 4,314,912 | 2/1982  | Lowery et al.  | 502/119 X |
| 4,330,647 | 5/1982  | Sakurai et al. | 502/121 X |
| 4,363,746 | 12/1982 | Capshew        | 502/119 X |
| 4,471,066 | 9/1984  | Sakurai et al. | 502/119 X |
| 4,490,475 | 12/1984 | Bailly et al.  | 502/121 X |

FOREIGN PATENT DOCUMENTS 2529209 12/1983 France .
2018789 10/1979 United Kingdom .
1586267 3/1981 United Kingdom .

Primary Examiner—Patrick P. Garvin
Attorney, Agent, or Firm—Wallace L. Oliver; William H. Magidson; Ralph C. Medhurst

[57] ABSTRACT

A solid hydrocarbon-insoluble, alpha-olefin polymerization catalyst component with superior activity, stereospecificity and morphology characteristics, comprises the product formed by (a) complexing a magnesium alkyl composition with an organophosphoryl compound; (b) reacting the resulting stable complex with a compatible precipitation agent to form a solid component; and (c) reacting the resulting solid with a titanium (IV) compound and an electron donor compound in a suitable diluent.

27 Claims, No Drawings

SUPPORTED OLEFIN POLYMERIZATION CATALYST PRODUCED FROM A MAGNESIUM ALKYL/ORGANOPHOSPHORYL COMPLEX

CROSS-REFERENCE TO RELATED APPLICATIONS

This is a continuation-in-part to U.S. application Ser. No. 674,996, filed Nov. 26, 1984, and now U.S. Pat. No. 4,581,342, incorporated by reference herein.

BACKGROUND OF THE INVENTION

This invention relates to catalyst systems useful for polymerizing alpha-olefins and particularly relates to a supported titanium halide catalyst component containing a specific organophosphoryl compounds.

Magnesium-containing supported titanium halide-based alpha-olefin polymerization catalyst components are now well known in the art. Typically, these catalysts are recognized for their performance based on activity and stereospecificity. However, commercial olefin polymerization, especially gas-phase alpha-olefin polymerization, requires additional catalyst attributes for economical large-scale operation. Specifically, polymer morphology, typically dependent upon catalyst morphology, many times is critical. Included in good polymer morphology is uniformity of particle size and shape, resistance to attrition and an acceptably high bulk density. Minimization of very small particles (fines) typically is very important, especially in gas-phase polymerization to avoid transfer or recycle line pluggage. Very large particles also must be avoided to minimize formation of lumps and strings in the reactor. It has been found that usual modification of conventional supported catalysts to optimize morphology typically sacrifices such catalysts original activity and stereospecificity.

One catalyst system which exemplifies the activity-/morphology dilemma is prepared by chlorination and precipitation of a hydrocarbon-soluble alkyl magnesium composition (which also may contain an aluminum alkyl compound) to a nearly spherical, uniform support. An olefin polymerization catalyst component is formed from such support by treatment with titanium tetrachloride and a suitable Lewis base. It has been found that a di-n-butylmagnesium/triethylaluminum complex reacted with silicon tetrachloride to form spherical support particles which were then reacted with titanium tetrachloride and diisobutylphthalate exhibited both low activity and low stereospecificity in propylene polymerization. A possible way to improve such a catalyst would be to include a Lewis base during formation of a chlorinated support and prior to introduction of titanium tetrachloride. Among possible bases, aromatic esters, specifically ethylbenzoate, have almost universally been found to be the best compounds for this purpose. However, the use of such aromatic ester is incompatible with use of a magnesium alkyl. Usual aromatic esters such as ethylbenzoate, ethyl p-anisate, methyl-p-toluate or dialkylphthalates react rapidly and irreversibly with magnesium alkyls through alkylation of the esters. Also, it has been found that the precipitation reaction with silicon tetrachloride is disrupted and the particle uniformity or particle morphology of a resultant catalyst is destroyed.

Use of magnesium alkyls in preparation of supported olefin polymerization catalysts is known. However, formation of a stable magnesium alkyl complex with an organophosphoryl compound prior to precipitation has not been described. Examples of use of magnesium alkyls are U.S. Pat. Nos. 4,115,319, 4,199,473, 4,321,347 and 4,416,799; U.K. Pat. Nos. 1,586,267 and 2,018,789; Published European Patent Applications 45,533 and 67,416; and French Pat. No. 2,529,209.

Catalyst components of the present invention are formed using stable complexes of a magnesium alkyl composition and an organophosphoryl compound. Although not describing such donor-acceptor complexes of the present invention, French Pat. No. 2,529,209 discloses a catalyst component prepared from spherical magnesium chloride made by chlorinating di-n-butyl magnesium in isoamyl ether with t-butylchloride. Although we have observed that addition of specific amounts of a base such as isoamyl ether or 2,2,6,6,-tetramethylpiperidine to a magnesium alkyl-aluminum alkyl composition prior to reaction with silicon tetrachloride improves overall performance of a resultant catalyst without destroying morphology, catalysts formed using the organophosphoryl compounds of this invention achieve a much greater improvement in catalyst performance.

SUMMARY OF THE INVENTION

A solid hydrocarbon-insoluble, alpha-olefin polymerization catalyst component with superior activity, stereospecificity and morphology characteristics, comprises the product formed by (a) complexing a magnesium alkyl composition with an organophosphoryl compound; (b) reacting the resulting stable complex with a compatible precipitation agent to form a solid component; and (c) reacting the resulting solid with a titanium-(IV) compound and an electron donor compound in a suitable diluent.

BRIEF DESCRIPTION OF THE INVENTION

Catalysts prepared according to this invention show high activity and stereospecificity with controlled morphology characteristics in alpha-olefin, especially propylene, polymerization. These catalysts are based on supports derived from the complexation of magnesium alkyls with a special class of organophosphoryl compounds. It has been found that combinations of certain organophosphoryl compounds with a magnesium alkyl compound prior to precipitation with a halogenating agent, such as silicon tetrachloride, greatly increases the activity of the ensuing catalyst while reducing combined hexane solubles and extractables. Excellent morphology aspects of a precipitated support are retained with the polymer produced exhibiting an extremely narrow particle size distribution. Catalysts prepared by this method differ from those using weaker bases, for example ethers and hindered amines, in that the ester is retained as a stoichiometric component of the halogenated support. The catalyst component of this invention typically is prepared by complexing a magnesium alkyl composition with a specific class of organophosphoryl compound, followed by reaction with a compatible precipitation agent and a suitable titanium(IV) compound in combination with an electron donor compound in a suitable diluent.

In the complexation of the magnesium alkyl composition with the organophosphoryl compound, typically, the molar ratio of magnesium to ester ranges from about 1/1 to about 3/1, preferably about 1.5/1 to about 2/1. By using a molar excess of magnesium alkyl compound essentially all of the hindered aromatic ester is complexed. Typically, the complexation occurs at room temperature in a non-reactive hydrocarbon-based solvent, although suitable lower or higher temperatures may be used.

In the precipitation reaction, the magnesium alkylorganophosphoryl compound complex is combined with a suitable precipitation agent such as silicon tetrachloride. In a typical procedure the two components are mixed at about room temperature with stirring. The mixture may be heated moderately to accelerate the precipitation reaction for about one to twenty-four hours. The resulting solid precipitate may be isolated and washed with a suitable liquid hydrocarbon before reaction with a titanium(IV) compound.

The solid precipitate obtained by reacting a precipitation agent with the magnesium alkyl-organophosphoryl compound complex is combined with a suitable titanium(IV) compound in a suitable diluent. Typically, this mixture is permitted to react by heating to moderate temperature up to about 120° C. A convenient method is to conduct the reaction at reflux temperature of the diluent. Usual reaction times are from about one to about four hours. Typically, the resulting solid, hydrocarbon-insoluble component is isolated and washed with a suitable hydrocarbon.

A key aspect to this invention is the formation of a stable complex between a magnesium alkyl and the organophosphoryl compound. It is believed that the superior solid catalyst components of this invention are formed through a complex of an organophosphoryl compound and a magnesium alkyl. The term organophosphoryl compound refers to a compound having a general structure:

wherein X=—R or —OR; Y=—R or —OR; and Z=—NR$_2$, —SR, —Cl, —Br, —R, —OR, (RO)$_2$P(O)— or (RO)$_2$P(O)O—; and in which R represents a hydrocarbyl radical containing 1 to about 12, preferably 2 to about 8, carbon atoms. Within a suitable organophosphoryl compound, R may represent the same or different hydrocarbyl radicals. Suitable compounds include derivatives of phosphinic acid, phosphonic acid, diphosphates, hypophosphites and phosphine oxide. Specific examples of useful phosphoryl compounds useful in this invention include dibutylbutylphosphonate, dimethylmethylphosphonate, diethylphenylphosphonate, diethyl(1-naphthyl)phosphonate, di-n-propylphenylphophonate, di-isobutylmethylphosphonate, di-n-octylphenylphosphonate, and the like; triethylphosphate, tributylphosphate, triphenylphosphate, and the like; ethyldiethylphosphinate, butyldibutylphosphinate, butyldiphenylphosphinate, ethyldiphenylphosphinate, and the like; and trimethylphosphine oxide, triethylphosphine oxide, triphenylphosphine oxide, and the like. Phosphonate derivatives are preferred with alkyl-substituted phosphonates most preferred. Dibutylbutylphosphonate and dimethylmethylphosphonate have been found to be particularly suitable with dibutylbutylphosphonate most preferred.

Magnesium alkyls useful in this invention include those with alkyl groups containing about 1 to 10 carbon atoms and particularly dimethyl magnesium, di-n-propyl magnesium, diethyl magnesium, di-n-butyl magnesium butyloctyl magnesium and the like. The alkyl groups contained in such magnesium alkyls may be the same or different. Mixtures of magnesium alkyls may be used. The preferable magnesium alkyl is di-n-butyl magnesium. Such magnesium alkyls also may be used in conjunction with aluminum alkyls such as triethylaluminum or other chain-breaking agents such as diethyl ether to modify viscosity of the alkyl mixture. One such useful mixture is referred to as MAGALA (7.5)-E which is a di-n-butyl magnesium/triethyl aluminum mixture. Another useful mixture is BOMAG-D which is a mixture of butyloctyl magnesium and about 0.25 wt. % diethylether.

In a typical preparation scheme an excess of magnesium alkyl or magnesium alkyl/aluminum alkyl mixture is complexed with a portion of a suitable organophosphoryl compound. Formation of a complex typically can be confirmed by observing a shift of the absorbance due to P=O stretching in the infrared spectrum. In a complex between di-n-butyl-n-butylphosphonate and MAGALA (7.5)-E a shift and splitting of a P=O stretching absorbance from 1255 cm$^{-1}$ to 1235 and 1211 cm$^{-1}$ was noted. A test for a suitable hindered aromatic ester useful in this invention is to react an aromatic ester with a two molar excess of a dialkyl magnesium such as MAGALA (7.5)-E and determine the stability of the resulting complex by observing a decrease in infrared absorbance of the complexed P=O band as a function of time. A complex described in this invention should show stability for a time sufficient to undergo the precipitation step described herein. Practically, such a complex should be stable for at least one-half hour and preferably for more than one hour.

The above-described complex can be reacted with a precipitation agent such as silicon tetrachloride with resulting solid material typically washed and separated. Typically, such solid material contains a substantial quantity of the organophosphoryl compound. Such solid precipitates then can be combined with a titanium-containing compound such as titanium tetrachloride and a suitable electron donor such as an aromatic ester usually in a compatible diluent such as toluene, chlorobenzene, or a mixture of chlorobenzene and a chlorinated alkane and reacted at a suitable temperature typically from about 80° C. to about 140° C. and preferably about 90° C. to about 120° C.

Compatible precipitation agents useful in this invention typically halogenate the magnesium alkyl-hindered ester complex and include silicon tetrachloride. Other suitable precipitation agents include tert-butyl chloride and dry hydrogen chloride. Some agents which halogenate magnesium compounds may not be suitable precipitation agents useful in this invention. For example, titanium tetrachloride is not a compatible precipitation agent because reduction of the titanium by magnesium results in coprecipitation of undesirable titanium trichloride species.

Organic electron donors useful in Step C in preparation of stereospecific supported catalyst components many times can be organic compounds containing one or more atoms of oxygen, nitrogen, sulfur and phosphorus. Such compounds include organic acids, organic acid esters, alcohols, ethers, aldehydes, ketones, amines, amine oxides, amides, thiols and various phosphorous acid esters and amides and like. Mixtures of organic electron donors can be used if desired. Specific examples of useful oxygen-containing electron donor compounds include organic acids and esters. Useful organic acids contain from 1 to about 20 carbon atoms and 1 to about 4 carboxyl groups.

The preferred electron donor compounds include esters of aromatic acids. Preferred organic electron donors according to this invention are $C_1$–$C_6$ alkyl esters of aromatic mono- and di-carboxylic acids and halogen-, hydroxyl-, oxo-, alkyl-, alkoxy-, aryl-, and aryloxy-substituted aromatic mono- and di-carboxylic acids. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferable esters include ethyl p-anisate and methyl-p-toluate. An especially preferred aromatic ester is a dialkylphthalate ester in which the alkyl group contains from about two to about ten carbon atoms. Examples of preferred phthalate ester are diisobutylphthalate, diethylphthalate, and di-n-butylphthalate.

Titanium(IV) compounds useful in reacting the precipitated solid compound of this invention are titanium halides and haloalcoholates having 1 to about 20 carbon atoms per alcoholate group. Mixtures of titanium compounds can be employed if desired. Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides, particularly titanium tetrachloride ($TiCl_4$), are most preferred.

Typical suitable diluents useful in Step C of the preparation procedure for the catalyst component of this invention are aromatic or substituted aromatic liquids, although other hydrocarbon-based liquids may be used. Aromatic hydrocarbons, such as toluene, and substituted aromatics, such as chlorobenzene have been found suitable. A preferable diluent is a halogenated aromatic such as chlorobenzene or a mixture of a halogenated aromatic such as chlorobenzene and a halogenated aliphatic such as dichloroethane. A suitable diluent should boil at a high enough temperature to promote reaction and not adversely affect resulting catalyst performance.

Other examples of useful diluents include alkanes such as hexane, cyclohexane, ethylcyclohexane, heptane, octane, nonane, decane, undecane, and the like; haloalkanes such as 1,2-dichloroethane, 1,1,2-trichloroethane, carbon tetrachloride and the like; aromatics such as benzene, toluene, xylenes and ethylbenzene; and halogenated and hydrogenated aromatics such as chlorobenzene and o-dichlorobenzene.

In addition, the reaction mixture in Step C of a magnesium-containing compound and transition metal component such as a titanium(IV) compound can contain chlorocarbons and/or organo silanes. Chlorocarbons and/or organochlorosilanes are advantageously present during the reaction of the transition metal component to provide a better medium for the activation of the catalyst.

Suitable useful chlorocarbons contain one to about 12 carbon atoms and from one to about 10 chlorine atoms. Examples of chlorocarbons include chloroform, methylene chloride, 1,2-dichloroethane, 1,1-dichloroethane, 1,1,2-trichloroethane, 1,1,1-trichloroethane, carbon tetrachloride, ethyl chloride, 1,1,2,2-tetrachloroethane, pentachloroethane, hexachloroethane, 1,1-dichloropropane, 1,2-dichloropropane, 1,3-dichloropropane, 2,2-dichloropropane, 1,1,1-trichloropropane, 1,1,2-trichloropropane, 1,1,3-trichloropropane, 1,2,3-trichloropropane, 1,1,1,2-tetrachloropropane, 1,1,2,2-tetrachloropropane, 1,1,1,2,3-pentachloropropane, 1,1,2,3,3-pentachloropropane, 2-methyl-1,2,3-trichloropropane, 1,1-dichlorobutane, 1,4-dichlorobutane, 1,1-dichloro-3-methylbutane, 1,2,3-trichlorobutane, 1,1,3-trichlorobutane, 1,1,1,2-tetrachlorobutane, 1,2,2,3-tetrachlorobutane, 1,1,2,3,4,4-hexachlorobutane, 1,1,2,2,3,4,4-heptachlorobutane, 1,1,2,3,4-pentachlorobutane, 2-methyl-2,3,3-trichlorobutane, 1,2-dichloropentane, 1,5-dichloropentane, 1,1,2,2-tetrachlorohexane, 1,2-dichlorohexane, 1,6-dichlorohexane, 3,4-dichloro-3,4-dimethylhexane and the like. Preferable chlorocarbons used in this invention include carbon tetrachloride, 1,1,2-trichloroethane and pentachloroethane.

Alkylchlorosilanes and haloalkylchlorosilanes useful in this invention include compounds with the formula

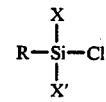

wherein R is an alkyl or a haloalkyl radical containing one to about ten carbon atoms or a halosilyl radical or haloalkylsilyl radical containing one to about eight carbon atoms, and X and X' are halogen, hydrogen, or alkyl or haloalkyl radicals containing one to about ten carbon atoms. Typically, R is an alkyl or chloroalkyl radical containing one to about eight carbon atoms and one to about twelve chlorine atoms, and X is chlorine or a chloroalkyl radical containing one to four carbon atoms, and X' is a hydrogen or chlorine. Preferable alkylchlorosilanes include trimethylchlorosilane and dimethyldichlorosilane. Preferable haloalkylchlorosilanes useful in this invention are dichlorosilanes and trichlorosilanes. Also preferable are haloalkylchlorosilanes containing a chloroalkyl group containing one to about four carbon atoms and one to ten chlorine atoms. Preferable haloalkylchlorosilanes include dichloromethyl trichlorosilane, trichloromethyl trichlorosilane, dichloromethyl dichlorosilane, trichloromethyl dichlorosilane, chloromethyl trichlorosilane and hexachlorodisilane. Trichloromethyl trichlorosilane and dichloromethyl trichlorosilane are most preferred.

In preparation of the stereospecific supported catalyst components of this invention, typically, the magnesium-containing product, titanium(IV) component, and hindered ester component are contacted in amounts such that the atomic ratio of titanium to metal in the magnesium-containing component is at least about 0.5:1. Preferably, this ratio ranges from about 0.5:1 to about 20:1 and more preferably, from about 2:1 to about 15:1. The electron donor component used in Step C is used in an amount ranging from about 0.001 to about 1.0 mole per gram atom of titanium, and preferably from about 0.005 to about 0.6 mole per gram atom. Best results are achieved when this ratio ranges from about 0.01 to about 0.3 mole per gram atom of titanium.

Typically, at least equimolar amounts of the precipitation agent to magnesium alkyl-ester complex is used, although the precipitation agent conveniently may be used in moderate excess.

Due to the sensitivity of catalyst components to catalyst poisons such as water, oxygen, and carbon oxides, the catalyst components are prepared in the substantial absence of such materials. Catalyst poisons can be excluded by carrying out the preparation under an atmosphere of an inert gas such as nitrogen or argon, or an atmosphere of alpha-olefin. As noted above, purification of any diluent to be employed also aids in removing poisons from the preparative system.

As a result of the above-described preparation there is obtained a solid reaction product suitable for use as a catalyst component. Prior to such use, it is desirable to remove incompletely-reacted starting materials from the solid reaction product. This is conveniently accomplished by washing the solid, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

Although not required, the solid reaction product prepared as described herein may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III–V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired. Such Lewis acid may be used in a compatible diluent.

Although not required, the above-described solid reaction product may be washed with an inert liquid hydrocarbon or halogenated hydrocarbon before contact with a Lewis acid. If such a wash is conducted it is preferred to substantially remove the inert liquid prior to contacting the washed solid with Lewis acid.

Although the chemical structure of the catalyst components described herein is not presently known, the components preferably contain from about 1 to about 6 wt. % titanium, from about 10 to about 25 wt. % magnesium, and from about 45 to about 65 wt. % halogen. Preferred catalyst components made according to this invention contain from about 1.0 to about 3 wt. % titanium, from about 15 to about 21 wt. % magnesium and from about 55 to about 65 wt. % chlorine. When a silane cocatalyst modifier is used, it is believed that both phosphorus and silicon remain in the final catalyst possibly in the form of a polymeric complex such as $((RPO_3)-2Si)_x$.

The titanium-containing catalyst component of this invention may be prepolymerized with an alpha-olefin before use as a polymerization catalyst component. In prepolymerization catalyst and an organoaluminum compound co-catalyst such as triethylaluminum are contacted with an alpha-olefin such as propylene under polymerization conditions, preferably in the presence of a modifier such as a silane and in an inert hydrocarbon such as hexane. Typically, the polymer/catalyst weight ratio of the resulting prepolymerized component is about 0.1:1 to about 20:1. Prepolymerization forms a coat of polymer around catalyst particles which in many instances improves particle morphology, activity, stereospecificity and attrition resistance.

The titanium-containing catalyst component of this invention is used in a polymerization catalyst containing a co-catalyst component including a Group II or III metal alkyls and, typically, one or more modifier compounds.

Useful Group II and IIIA metal alkyls are compounds of the formula $MR_m$ wherein M is a Group II or IIIA metal, each R is independently an alkyl radical of 1 to about 20 carbon carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl.

From the standpoint of catalyst component performance, preferred Group II and IIIA metal alkyls are those of magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_{12}H_{25})_2$, $Al(CH_3)_3$, $Al(C_2H_5)_3$, $Al(C_3H_7)_3$, $Al(C_4H_9)_3$, $Al(C_6H_{13})_3$, and $Al(C_{12}H_{25})_3$. More preferably a magnesium, zinc, or aluminum alkyl containing 1 to about 6 carbon atoms per alkyl radical is used. Best results are achieved through the use of trialkylaluminums containing 1 to about 6 carbon atoms per alkyl radical, and particularly triethylaluminum and triisobutylaluminum or a combination thereof.

If desired, metal alkyls having one or more halogen or hydride groups can be employed, such as ethylaluminum dichloride, diethylaluminum chloride, ethylaluminum sesquichloride, diisobutylaluminum hydride, and the like.

To maximize catalyst activity and stereospecificity, it is preferred to incorporate one or more modifiers, typically electron donors, and including compounds such as silanes, mineral acids, organometallic chalcogenide derivatives of hydrogen sulfide, organic acids, organic acid esters and mixtures thereof.

Organic electron donors useful as cocatalyst modifiers useful in this invention are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors can be employed if desired.

Preferred organic acids and esters are benzoic acid, halobenzoic acids, phthalic acid, isophthalic acid, terephthalic acid and the alkyl esters thereof wherein the alkyl group contains 1 to about 6 carbon atoms such as methyl benzoate, methyl bromobenzoates, ethyl benzoate, ethyl chlorobenzoates, butyl benzoate, isobutyl benzoate, methyl anisate, ethyl anisate, methyl p-toluate, hexyl benzoate, and cyclohexyl benzoate, and diisobutyl phthalate as these give good results in terms of activity and stereospecificity and are convenient to use.

The polymerization co-catalyst useful in this invention advantageously contains an aromatic silane modifier. Preferable silanes useful in co-catalysts in this invention include alkyl-, aryl-, and/or alkoxy-substituted silanes containing hydrocarbon moieties with one to about 20 carbon atoms. Especially preferred silanes are aryl-substituted having a structure:

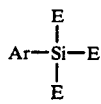

wherein Ar is an aryl group of about 6 to about 20 carbon atoms, such as phenyl, dodecylphenyl, cresyl, and the like, each E is independently R' or OR' with R' having 1 to about 20 carbon atoms. The preferred aromatic silanes include diphenyldimethoxysilane, phenyltrimethoxysilane, phenylethyldimethoxysilane and methylphenyldimethoxysilane.

The above-described catalysts of this invention are useful in polymerization of alpha-olefins such as ethylene and propylene, and are most useful in stereospecific polymerization of alpha-olefins containing 3 or more carbon atoms such as propylene, butene-1, pentene-1, 4-methylpentene-1, and hexene-1, as well as mixtures thereof and mixtures thereof with ethylene. The invented catalysts are particularly effective in the stereospecific polymerization of propylene or mixtures thereof with up to about 20 mole % ethylene or a higher alpha-olefin. Propylene homopolymerization is most preferred. According to the invention, highly crystalline polyalphaolefins are prepared by contacting at least one alpha-olefin with the above-described catalyst compositions under polymerizing conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry-, bulk-, and vapor-phase polymerization processes are contemplated herein.

The amount of catalyst to be employed varies depending on choice of polymerization technique, reactor size, monomer to be polymerized, and other factors known to persons of skill in the art, and can be determined on the basis of the examples appearing hereinafter. Typically, catalysts of this invention are used in amounts ranging from about 0.2 to 0.05 milligrams of catalyst to gram of polymer produced.

Irrespective of the polymerization process employed, polymerization should be carried out at temperatures sufficiently high to ensure reasonable polymerization rates and avoid unduly long reactor residence times, but not so high as to result in the production of unreasonably high levels of stereorandom products due to excessively rapid polymerization rates. Generally, temperatures range from about 0° to about 120° C. with about 20° to about 95° C. being preferred from the standpoint of attaining good catalyst performance and high production rates. More preferably, polymerization according to this invention is carried out at temperatures ranging from about 50° to about 80° C.

Alpha-olefin polymerization according to this invention is carried out at monomer pressures of about atmospheric or above. Generally, monomer pressures range from about 20 to about 600 psi, although in vapor phase polymerizations, monomer pressures should not be below the vapor pressure at the polymerization temperature of the alpha-olefin to be polymerized.

The polymerization time will generally range from about ½ to several hours in batch processes with corresponding average residence times in continuous processes. Polymerization times ranging from about 1 to about 4 hours are typical in autoclave-type reactions. In slurry processes, the polymerization time can be regulated as desired. Polymerization times ranging from about ½ to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well-known diluents. It often is desirable to purify the polymerization medium prior to use, such as by distillation, percolation through molecular sieves, contacting with a compound such as an alkylaluminum compound capable of removing trace impurities, or by other suitable means.

Examples of gas-phase polymerization processes in which the catalyst of this invention is useful include both stirred bed reactors and fluidized bed reactor systems are described in U.S. Pat. Nos. 3,957,448, 3,965,083, 3,971,768, 3,970,611, 4,129,701, 4,101,289; 3,652,527 and 4,003,712 all incorporated by reference herein. Typical gas phase olefin polymerization reactor systems comprise a reactor vessel to which olefin monomer and catalyst components can be added and which contain an agitated bed of forming polymer particles. Typically, catalyst components are added together or separately through one or more valve-controlled ports in the reactor vessel. Olefin monomer, typically, is provided to the reactor through a recycle gas system in which unreacted monomer removed as off-gas and fresh feed monomer are mixed and injected into the reactor vessel. A quench liquid which can be liquid monomer, can be added to polymerizing olefin through the recycle gas system in order to control temperature.

Irrespective of polymerization technique, polymerization is carried out under conditions that exclude oxygen, water, and other materials that act as catalyst poisons. Typically, no special precautions need be taken to exclude such materials because a positive pressure of monomer gas commonly exists within the reactor.

Also, according to this invention, polymerization can be carried out in the presence of additives to control polymer molecular weights. Hydrogen is typically employed for this purpose in a manner well known to persons of skill in the art.

Although not usually required, upon completion of polymerization, or when it is desired to terminate polymerization or deactivate the catalysts of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Polymer yields are sufficiently high relative to the amount of catalyst employed so that useful products can be obtained without separation of catalyst residues. Further, levels of stereo-random by-products are sufficiently low so that useful products can be obtained without separation thereof.

The polymeric products produced in the presence of the invented catalysts can be fabricated into useful articles by extrusion, injection molding, and other common techniques.

The invention described herein is illustrated, but not limited, by the following Examples and Comparative Runs.

EXAMPLE I

Step A—Formation of Magnesium/Organophosphoryl Complex

In an inert atmosphere dry box, a solution of 5.0 milliliters of di-n-butyl-n-butyl phosphonate (DBBP) and 100 milliliters of MAGALA (7.5)-E (10.3 wt. % solution of di-n-butyl magnesium and triethylaluminum in hexane containing 1.63 wt. % Mg and 0.25 wt. % Al) was prepared and sealed in a four-ounce bottle with a rubber septum. Formation of a stable complex in the resulting solution was confirmed by a shift and splitting of a P=O stretching frequency in the infrared spectrum (shift and split of $v_{P=O}$ from 1255 cm$^{-1}$ to 1235 and 1211 cm$^{-1}$).

Step B—Precipitation with Silicon Tetrachloride

To 100 milliliters of reagent grade silicon tetrachloride in a one-liter resin kettle equipped with a condenser and mechanical stirrer was added the solution from Step A under a blanket of prepurified nitrogen over a period of 60 minutes with stirring (600 rpm). During addition the temperature of the mixture rose to about 35°-38° C. When addition was complete, the resulting mixture was heated to 40°-45° C. for 16 hours during which time precipitation of a white solid was complete. The solid was washed with five 100-milliliter aliquots of purified hexane, put into the dry box, filtered and weighed. A total of 7.6 grams of white solid was recovered.

Step C—Titanium(IV) Compound Addition

A 7.6-gram sample of the solid recovered in Step B was combined with 280 milliliters of chlorobenzene in a one-liter resin kettle equipped as describe above. To this mixture were added 100 milliliters of titanium tetrachloride followed by 4.0 milliliters of diisobutylphthalate (DIBP). The resulting mixture was heated to 130° C. and stirred for 1½ hours. Supernatant liquid was decanted and the residue washed twice with 200-milliliter portions of toluene and three times with 200-milliliter portions of hexane. A total of 2.6 grams of solid was recovered. Analysis of this solid product showed 46.8 wt. % chlorine, 14.7 wt. % magnesium, 1.6 wt. % titanium and 12.6 wt. % diisobutylphthalate.

EXAMPLE II

Another catalyst component was prepared in a manner similar to that described in Example I except that 6.0 milliliters of phosphonate were used in Step A and the temperature during addition of reagent to silicon tetrachloride was maintained constant at 20° C. A total of 3.4 grams of catalyst component was recovered.

EXAMPLE III

Another catalyst component was prepared in a manner similar to that described in Example I except that in Step A, the amount of MAGALA was 200 milliliters and the amount of phosphonate was 10 milliliters. In Step B, a 500-milliliter resin kettle and 200 milliliters of silicon tetrachloride were used. Reaction temperature reached 51° C. A total of 8.3 grams of solid was recovered. In Step C, the 500-milliliter resin kettle was used with the following amounts of reagents: 2.6 grams of Step B solid; 150 milliliters of chlorobenzene; 30 milliliters of titanium tetrachloride; and 1.6 milliliters of DIBP. The chlorobenzene/TiCl$_4$/DIBP molar ratio was 150/30/1.6. Toluene washes were 75 milliliters each and hexane washes were 100 milliliters each. A total of 1.0 gram of catalyst component was recovered (1.8 wt. % Ti; 19.2 wt. % Mg; 58.2 wt. % Cl; 0.4 wt. % P; 0.77 wt. % Si; 10.5 wt. % DIBP).

EXAMPLE IV

Another catalyst component was prepared in a manner similar to that described in Example III except that in Step A, 3.22 milliliters of triethylphosphate (TEP) were combined with 100 milliliters of MAGALA. In Step B, 100 milliliters of silicon tetrachloride was used, the reaction temperature reached 43° C. and 6.0 grams of solid was recovered. In Step C, 1.05 milliliters of DIBP were used and 1.3 grams of catalyst component was recovered.

Comparative Run A

A comparative catalyst component was prepared in a manner similar to Example III except that 9.67 milliliters of triisopropyl phosphite (TIPP) were combined with 100 milliliters of MAGALA in Step A. In Step B, 100 milliliters of silicon tetrachloride were used and 6.4 grams of solid was recovered. In Step C, 3.0 grams of Step B solid were used with 2.1 milliliters of DIBP and 40 milliliters of titanium tetrachloride. The final catalyst component contained 35.6 wt. % chlorine, 5.7 wt. % magnesium, 7.2 wt. % titanium and 27.7 wt. % diisobutylphthalate.

Comparative Run B

A comparative catalyst component was prepared in a manner similar to that described in Example III except that in Step A no phosphonate or other Lewis base was used. In Step B, to a mixture of 100 milliliters of silicon tetrachloride, 50 milliliters of MAGALA (7.5)-E were added dropwise. A total of 3.7 grams of solid were recovered.

The solid from Step B was combined with 75 milliliters of chlorobenzene, 1.2 milliliters of 1,2-dichloroethane, 40 milliliters of titanium tetrachloride and 2.1 milliliters of diisobutylphthalate and heated to 102° C. for two hours. A total of 2.8 grams of solid catalyst was recovered (2.2 wt. % Ti; 19.3 wt. % Mg; 58.7 wt. % Cl; 13.2 wt. % DIBP).

EXAMPLE V

Another catalyst component was prepared in a manner similar to that described in Example III except that in Step A, 3.0 milliliters of dimethylmethylphosphonate (DMMP) were combined with 100 milliliters of MAGALA. In Step C, the chlorobenzene/TiCl$_4$/DIBP molar ratio was 150/30/1.05. A total of 2.2 grams of catalyst component were recovered (1.9 wt. % Ti; 16.8 wt. % Mg; 52.8 wt. % Cl; 1.18 wt. % P; 8.4 wt. % DIBP).

EXAMPLE VI

Another catalyst component was prepared in a manner similar to that described in Example III except that in Step C, the chlorobenzene/TiCl$_4$/DIBP molar ratio was 150/30/1.0. A total of 0.9 grams of catalyst component were recovered (1.9 wt. % Ti; 17.9 wt. % Mg; 56.2 wt. % Cl; 0.32 wt. % P; 8.4 wt. % DIBP).

EXAMPLE VII

Another catalyst component was prepared in a manner similar to that described in Example III except that in Step A BOMAG-O was used as the source of magnesium alkyl. In Step C, the chlorobenzene/TiCl$_4$/DIBP molar ratio was 150/30/1.0. A total of 1.4 grams of catalyst component were recovered (2.0 wt. % Ti; 18.2 wt. % Mg; 57.2 wt. % Cl; 0.4 wt. % P; 7.9 wt. % DIBP).

Polymerization Tests

The titanium-containing catalyst components prepared above were tested in batch hexane-slurry propylene polymerizations. A two-liter Parr reactor was charged with 650 milliliters of hexane, 250 psig of propylene and 6.06 mmoles of hydrogen. About 20 milligrams of titanium-containing catalyst component together with a triethylaluminum (TEA)-based cocatalyst system (Al/Ti>200:1) including diphenyldimethoxysilane (DPDMSi) was used in the polymerization test run for two hours at 160° F. Results are shown in Tables I and II. Polymer particle size distributions for catalyst components from Example III using co-catalyst composition (b) are shown in Table III.

TABLE I

| | | Slurry Polymerization Performance | | | |
|---|---|---|---|---|---|
| Example (Run) | Lewis Base in Step B[1] | Cocatalyst System[2] | Yield (g/g) | Solubles (wt. %) | Extractables (wt. %) | Bulk Density (lbs/ft$^3$) |
| I | DBBP | a | 11,300 | 0.6 | 1.3 | 16.2 |
| I | DBBP | b | 11,200 | 0.6 | 0.8 | 16.2 |
| I | DBBP | c | 11,800 | 0.7 | 1.0 | 15.9 |
| II | DBBP | a | 14,800 | 0.4 | 0.8 | 14.7 |
| II | DBBP | b | 9,600 | 0.6 | 0.7 | 14.6 |
| II | DBBP | c | 15,400 | 0.4 | 1.1 | 14.5 |
| III | DBBP | a | 9,600 | 0.4 | 0.9 | 22.9 |
| III | DBBP | b | 10,800 | 0.4 | 0.9 | 22.7 |
| IV | TEP | a | 6,300 | 1.5 | 1.0 | 20.1 |
| IV | TEP | c | 6,700 | 1.2 | 1.1 | 20.2 |
| V | TMMP | a | 4,600 | 1.7 | 0.9 | 21 |
| VI | DBBP | a | 12,000 | 0.5 | 0.8 | 21 |
| VI | DBBP | d | 11,200 | 1.9 | 2.2 | 21 |
| VII | DBBP | a | 13,500 | 0.5 | 0.7 | 22.1 |
| VII | DBBP | c | 12,800 | 1.2 | 1.8 | 20.7 |
| A | TIPP | a | trace | — | — | — |
| A | TIPP | c | trace | — | — | — |
| B | none | a | 1,800 | 7.0 | 1.0 | 14.1 |

[1]DBBP = (C$_4$H$_9$O)$_2$P(O)(C$_4$H$_9$)
TEP = (C$_2$H$_5$O)$_3$P(O)
TIPP = (C$_3$H$_7$O)$_3$P
DMMP = (CH$_3$O)$_2$P(O)(CH$_3$)
[2]Cocatalyst Systems
TEA/DPDMSi Molar Ratios:
a = 20
b = 25
c = 40
d = 60

TABLE III

| | Polymer Particle Size Distribution | |
|---|---|---|
| Sieve No. | microns | Percent of Total Weight III |
| 20 | >850 | 0.2 |
| 40 | 425–850 | 0.5 |
| 60 | 250–425 | 45.7 |
| 80 | 180–250 | 50.2 |
| 100 | 150–180 | 3.0 |
| 200 | 75–150 | 0.2 |
| Pan | <75 | 0.1 |

These results demonstrate that the relative success of the catalysts described above depends on introducing in Step A a suitable Lewis base that meets the following requirements: First, the base must be unreactive (except for complexation) in the presence of the alkyl magnesium.

Secondly, the base must be such that its association with magnesium persists through a chlorination reaction. Weak bases such as diisoamylether and 2,2,6,6-tetramethylpiperidine are unable to meet this requirement.

Thirdly, the base must still be weak enough so that in the presence of titanium tetrachloride it is replaced by another base such as diisobutylphthalate which is preferred as a final catalyst component.

The data shown in Table III demonstrate that, based on the above description, a superior morphology catalyst can be prepared with excellent activity and stereospecificity. The necessity of an organophosphoryl compound as a complexing agent is demonstrated by Comparative Runs A and B in which either no phosphorus compound or a phosphorus compound without a P=O group was used. Neither of the resulting compositions were effective catalysts.

What is claimed is:

1. A solid, hydrocarbon-insoluble, alpha-olefin polymerization catalyst component comprising the product formed by:

A. complexing a magnesium alkyl composition with an organophosphoryl compound having a structure:

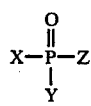

wherein X=—R or —OR; Y=—R or —OR; and Z=—NR$_2$, —Cl, —Br, —R, —OR, (RO)$_2$P(O)— or (RO)$_2$P(O)O—; and in which R represents a hydrocarbyl radical containing 1 to about 12 carbon atoms.

B. reacting the resulting stable complex with a compatible precipitation agent to form a solid component; and C. reacting the resulting solid with a titanium(IV) compound in a suitable diluent containing a suitable electron donor compound.

2. The catalyst component of claim 1 wherein the organophosphoryl compound is a hydrocarbyl derivative of a phosphonic acid, a phosphinic acid or a phosphine oxide.

3. The catalyst component of claim 1 wherein organophosphoryl compound is a hydrocarbyl derivative of a phosphonic acid.

4. The catalyst component of claim 1 wherein the organophosphoryl compound is dibutylbutylphosphonate, dimethylmethylphosphonate, or triethylphosphate.

5. The catalyst component of claim 1 wherein the organophosphoryl compound is dibutylbutylphosphonate.

6. The catalyst component of claim 1 wherein the titanium(IV) compound is titanium tetrachloride.

7. The catalyst component of claim 1 wherein the diluent in Step C is an aromatic hydrocarbon, a halogenated aromatic hydrocarbon or a mixture of a halogenated aromatic hydrocarbon and a halogenated aliphatic hydrocarbon.

8. The catalyst component of claim 1 wherein the diluent in Step C is chlorobenzene or a mixture of chlorobenzene and 1,2-dichloroethane.

9. The catalyst component of claim 1 wherein the electron donor compound in Step C is an aromatic carboxylic acid ester.

10. The catalyst component of claim 1 wherein the electron donor in Step C is a dialkylphthalate ester.

11. The catalyst of claim 9 wherein the ester is diisobutylphthalate.

12. The catalyst component of claim 1 wherein the precipitation agent is silicon tetrachloride, tert-butyl chloride or dry hydrogen chloride.

13. The catalyst component of claim 1 wherein the precipitation agent is silicon tetrachloride.

14. A catalyst component of claim 1 which is further treated with toluene and titanium tetrachloride.

15. The catalyst component of claim 1 wherein the magnesium alkyl composition contains alkyl group with two to about ten carbon atoms.

16. The catalyst composition of claim 1 wherein the magnesium alkyl composition is di-n-butyl magnesium, di-n-methyl magnesium, di-n-propyl magnesium or butyloctyl magnesium.

17. The catalyst component of claim 1 wherein the magnesium alkyl composition contains an aluminum alkyl.

18. The catalyst composition of claim 1 wherein the magnesium alkyl composition is a mixture of di-n-butyl magnesium and triethylaluminum.

19. The catalyst composition of claim 1 wherein the magnesium alkyl composition is a mixture of butyloctyl magnesium and diethylether.

20. A solid, hydrocarbon-insoluble alpha-olefin polymerization catalyst component of claim 1 comprising the product formed by:
A. complexing a magnesium alkyl composition with dibutylbutylphosphonate;
B. reacting the resulting stable complex with silicon tetrachloride to form a solid component; and
C. reacting the resulting solid with titanium tetrachloride in a liquid aromatic diluent containing a dialkylphthalate ester.

21. The catalyst component of claim 20 wherein the magnesium alkyl composition contains di-n-butyl magnesium or butyloctyl magnesium.

22. The catalyst component of claim 20 wherein the aromatic diluent in Step C is an aromatic hydrocarbon, a halogenated aromatic hydrocarbon or a mixture of a halogenated aromatic hydrocarbon and a halogenated aliphatic hydrocarbon.

23. A complex formed by contacting a magnesium alkyl composition with an organophosphoryl compound having a structure:

wherein X=—R or —OR; Y=—R or —OR; and Z=—NR$_2$, —Cl, —Br, —R, —OR, (RO)$_2$P(O)— or (RO)$_2$P(O)O—; and in which R represents a hydrocarbyl radical containing 1 to about 12 carbon atoms.

24. The complex of claim 23 wherein the organophosphoryl compound is a hydrocarbyl derivative of a phosphonic acid, a phosphinic acid or a phosphine oxide.

25. The complex of claim 23 wherein the magnesium alkyl composition contains alkyl groups with two to about ten carbon atoms.

26. The complex of claim 23 wherein the magnesium alkyl composition is di-n-butyl magnesium, di-n-methyl magnesium, di-n-propyl magnesium or butyloctyl magnesium.

27. The complex of claim 26 wherein the organophosphoryl compound is dibutylbutylphosphonate, dimethylmethylphosphonate, or triethylphosphate.

* * * * *